UNITED STATES PATENT OFFICE.

AUGUST EDUARD SCHUTTE, OF NORTHBORO, MASSACHUSETTS.

ROADWAY AND PAVEMENT.

1,218,218.

Specification of Letters Patent.

Patented Mar. 6, 1917.

No Drawing.

Application filed March 24, 1913. Serial No. 756,413.

*To all whom it may concern:*

Be it known that I, AUGUST EDUARD SCHUTTE, of Northboro, in the county of Worcester and State of Massachusetts, have invented certain new and useful Improvements in Roadways and Pavements, of which the following is a specification.

My invention relates to roadways known as "bituminous roadways" and composed of mixtures of sand and stone and bituminous compounds.

In constructing bituminous roadways two methods have been in vogue. The first, to heat the mineral aggregate and mix the same at a plant with a bituminous compound, haul the mixture while it is in a heated condition to the street where it was subsequently laid and rolled, or the other method, to mix the material with a liquid or soft asphalt which did not solidify enough to prevent the mixture being removed from cars and hauled on the street while cold. In this latter process no hard bitumen could be used, and the mixture after being placed on the street and rolled never had the solidity and firmness consistent with wear, while in the former case, an expensive plant was required to be located near the place of operation so that the material would not cool off in the haul, in which case it became absolutely useless.

My invention relates to a method of mixing stone and sand in appropriate proportions in a hot or warm condition, at a plant located at a quarry, and while such mixture was still warm and in the mixer to add to it an amount of finely powdered talc, soap stone, serpentine, ground asbestos or the like, enough to coat the particles or groups of particles with a coating of this material, so that after it was cool the particles or groups of particles composing the mixture would not adhere to each other but could be handled, shipped or carted in a manner similar to ordinary crushed stone. To use this material in the construction of a roadway it is coated with a solvent oil such as crude oil, soft bitumen or the like, which penetrates through the coating of talc (or the like), dissolves the bitumen, and when rolled cements the whole mass together into a solid waterproof roadway.

To practise my invention I coat the stone and sand mixture with a suitable bitumen of any desired hardness and while the mixture is still in the mixer I add to the revolving mass the dust or powder described, which coats the particles and prevents their adherence to each other. I then load the mixture into cars or carts and ship it to the place or town where the pavement is to be laid. After the same arrives there it is hauled to the street and there mixed in a mixer with the solvent oil, then placed, graded and leveled, after which it is consolidated by rolling.

Another method is to lay the mixture as it is hauled to the street, then coat with the oil or bitumen "*in situ*" by a sprayer or other suitable means and then roll and finish, as before described.

A flushcoating can then be placed upon this surface if desired.

Having described my invention, what I claim as new is:—

1. A method of constructing a roadway by mixing suitable mineral aggregate with bitumen, separating the mixture by means of non-adhesive powder such as talc, soapstone, serpentine or ground asbestos, into non-cohering groups and rendering these groups coherent by the addition of the solvent oil which permeates the talc and renders the whole capable of being rolled into an adherent durable roadway.

2. A method of constructing roadway by selecting a mineral aggregate, heating the same, adding a bituminous compound, and mixing until the bitumen has thoroughly permeated with the aggregate, then adding a non-adhesive powder such as talc, soap stone, serpentine, ground asbestos, or the like, which coats the particles and separates them into non-adhering groups, transporting such mixture to the place where it is to be used, there coating it with a "solvent oil" which penetrates through the non-adhesive coating, dissolves and softens the bituminous cement and produces an adherent and coherent mixture, which after rolling makes a water-tight, durable roadway.

In testimony whereof I have affixed my signature, in presence of two witnesses.

AUGUST EDUARD SCHUTTE.

Witnesses:
 CHARLES S. GRAHAM,
 EARLE W. PIMM.